(12) United States Patent
Hauler et al.

(10) Patent No.: US 9,063,546 B2
(45) Date of Patent: Jun. 23, 2015

(54) METHOD AND APPARATUS FOR OPERATING A MOTOR VEHICLE IN AN AUTOMATED DRIVING MODE

(71) Applicants: Florian Hauler, Karlsruhe (DE); Stefan Nordbruch, Kornwestheim (DE)

(72) Inventors: Florian Hauler, Karlsruhe (DE); Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/323,453

(22) Filed: Jul. 3, 2014

(65) Prior Publication Data

US 2015/0012166 A1    Jan. 8, 2015

(30) Foreign Application Priority Data

Jul. 4, 2013    (DE) .......................... 10 2013 213 169

(51) Int. Cl.
*G05D 1/02*    (2006.01)

(52) U.S. Cl.
CPC ............ *G05D 1/0212* (2013.01); *G05D 1/0268* (2013.01)

(58) Field of Classification Search
CPC ........................... G05D 1/0212; G05D 1/0268
USPC .......................................... 701/23, 24, 25, 26
See application file for complete search history.

(56) References Cited

FOREIGN PATENT DOCUMENTS

DE    10 2011 086 241        5/2013
DE    10 2011 086 241 A1 *   5/2013 ............. B60K 28/06

* cited by examiner

*Primary Examiner* — Mary Cheung
*Assistant Examiner* — Brian P Sweeney
(74) *Attorney, Agent, or Firm* — Kenyon & Kenyon LLP

(57) ABSTRACT

A method for operating a motor vehicle in an automated driving mode includes: identifying, using two devices, the current position, the objects and open spaces currently present in the vehicle surroundings; respectively identifying, by the two devices, a trajectory for independent vehicle guidance; and in two regulation devices, control signals for actuator devices are respectively identified and control is applied, in accordance with the previously calculated trajectory, to longitudinal-dynamics-influencing actuators and to transverse-dynamics-influencing actuators for vehicle control.

12 Claims, 2 Drawing Sheets

METHOD AND APPARATUS FOR OPERATING A MOTOR VEHICLE IN AN AUTOMATED DRIVING MODE

BACKGROUND OF THE INVENTION

1. Field of the Invention

The present invention relates to a method and an apparatus for operating a motor vehicle in an automated driving mode, in which, in two devices, the current position and the objects and open spaces currently present in the vehicle surroundings are identified; then, by way of two devices, a trajectory for independent vehicle guidance is respectively identified; then, in two regulation devices, control signals for actuator devices are respectively identified and control is applied, in accordance with the previously calculated trajectory, to longitudinal-dynamics-influencing actuators and to transverse-dynamics-influencing actuators for vehicle control, the doubling of the respective devices and the transfer of signals using different signal transfer paths between said devices enabling a high level of fail-safe reliability and operating dependability.

2. Description of the Related Art

Published German patent application document DE 10 2011 086 241 A1 discloses a computation unit and a method for safe parking of a vehicle, a check being made as to whether an emergency situation exists, such that after detection of an emergency situation a driver assistance system drives the vehicle to a roadside; and information from an external database is queried and taken into account by the driver assistance system.

BRIEF SUMMARY OF THE INVENTION

The essence of the present invention is to provide a method and a pertinent system that are capable of automatically guiding a vehicle and furthermore, in the case of failure of a system component or of a communication means, of safely continuing to guide the vehicle in the automated driving mode without endangering the vehicle occupants or other traffic participants.

Advantageously, the signal transfer paths between the individual modules, namely between the respective first and second devices for identifying the current position and the objects and open spaces currently present in the vehicle surroundings, between the first and second planning devices, between the first and second regulation devices, and between the first and second application of control to longitudinal-dynamics-influences and transverse-dynamics-influencing actuators, are embodied so that they are independent of one another and achieve a fault redundancy. This fault redundancy can be achieved, for example, in that output signals of the first device are conveyed selectably to the first or second device of the subordinate modules, or can be selectably conveyed from the second device to the first or second subordinate device. This yields a large plurality of different signal paths, with the result that a high level of fail-safe reliability can be achieved in the overall system.

It is further advantageous that selection devices are provided which decide whether the data identified respectively in the first device or in the parallel second device are to be conveyed to the subordinate modules. Provided for this purpose is a selection device that decides whether the position data and surroundings data identified in the first device for position identification and for identification of objects and open spaces located in the vehicle surroundings, or in the second device for position identification and for identification of objects and open spaces located in the vehicle surroundings, are conveyed to one of the subordinate planning devices. A further selection device is provided in order to decide whether the first trajectory identified in the first planning device or the second trajectory identified in the second planning device is conveyed to one of the subordinate regulation devices; and a further selection device decides whether the first control signals for actuator devices which are identified in the first regulation device, or the second control signals for actuator devices which are identified in the second regulation device, are conveyed to one of the signal inputs of the actuators for autonomous vehicle guidance.

It is further advantageous that the selection devices decide which of the subordinate planning devices the identified signals are to be conveyed to, in particular decide whether said signals are to be transferred to the first or second subordinate device. This can occur by way of a selection device that decides whether the signals identified in one of the devices for position identification and for detection of objects and open spaces located in the vehicle surroundings are conveyed to the first planning device or to the second planning device, and a further selection device is provided which decides whether the trajectory identified in one of the planning devices is conveyed to the first regulation device or to the second regulation device, and a further selection device is provided which decides whether the control signals for actuator devices which are identified in one of the regulation devices are conveyed to a first or to a second signal input of the respective actuators.

It is furthermore advantageous that one or more selection devices decide regarding the redundant signal transfer paths over which the signals from a selected device are conveyed to a subordinate selected device. A selection device that decides which of the multiple redundant signal transfer paths is used to transfer the position signals, the vehicle surroundings sensor signals, the trajectories, and the control signals for actuator devices, can be provided for this purpose.

It is furthermore advantageous that the application of control to the actuators for autonomous vehicle guidance also exhibits a failure redundancy. Provision can be made, for this purpose, that each of the longitudinal-dynamics-influencing or transverse-dynamics-influencing actuators for vehicle control can have control applied to it respectively by way of multiple, but at least two, signal inputs.

It is furthermore advantageous that each of the first and second devices carries out a processing of the delivered input data, the respective processing being independent of the other processing. It is particularly advantageous in this context that the identification of the first current position and of the first objects and open spaces located currently in the vehicle surroundings in the first device for position identification and for detection of objects and open spaces located in the vehicle surroundings, and the identification of the second current position and of the second objects and open spaces located currently in the vehicle surroundings by the second device for position identification and for detection of objects and open spaces located in the vehicle surroundings, occur mutually independently, and that the identification of the first trajectory in the first planning device and the identification of the second trajectory in the second planning device occur mutually independently, and that the generation of the first control signals for actuator devices in the first regulation device and the generation of the second control signals for actuator devices in the second regulation device likewise occur mutually independently.

It is furthermore advantageous that two trajectories are calculated in parallel and that one of the two trajectories is a standard trajectory that implements vehicle guidance in accordance with the destination setting defined by the driver and the current surroundings situation. The second of the two trajectories can be a safety trajectory that provides for safe stoppage of the vehicle in the event of an emergency as a function of the current vehicle surroundings situation. The standard trajectory can also be an upcoming sub-segment in accordance with the route of travel in the context of a destination setting defined by the driver.

It is furthermore advantageous that the first and the second device for position identification and for identification of objects and open spaces located in the vehicle surroundings, the first planning device and the second planning device, the first and the second regulation device, and the respective first and second signal input of the actuator devices, are powered by way of mutually independent energy supply systems. This refinement of course requires that the vehicle possess two independent vehicle electrical systems or energy sources. As a result of this advantageous refinement it is possible, upon failure of one of the two energy supply networks, to nevertheless continue guidance of the vehicle in an automatic vehicle mode as long as the second energy supply system continues to supply energy to half of the above-described autonomous vehicle guidance system and thus ensures secure and safe vehicle guidance at least to the nearest suitable stoppage point.

Realization of the method according to the present invention in the form of a control element that is provided for a control device of an automatic vehicle guidance system for a motor vehicle is of particular significance. In this context, a program that is executable on a computation device, in particular on a microprocessor or signal processor, and is suitable for performing the method according to the present invention, is stored on the control element. In this case the invention is therefore realized by a program stored on the control element, so that said control element equipped with the program represents the invention in the same way as the method for whose execution the program is suitable. An electrical storage medium, for example a read-only memory, can in particular be utilized as a control element.

DETAILED DESCRIPTION OF THE INVENTION

Figure 1:
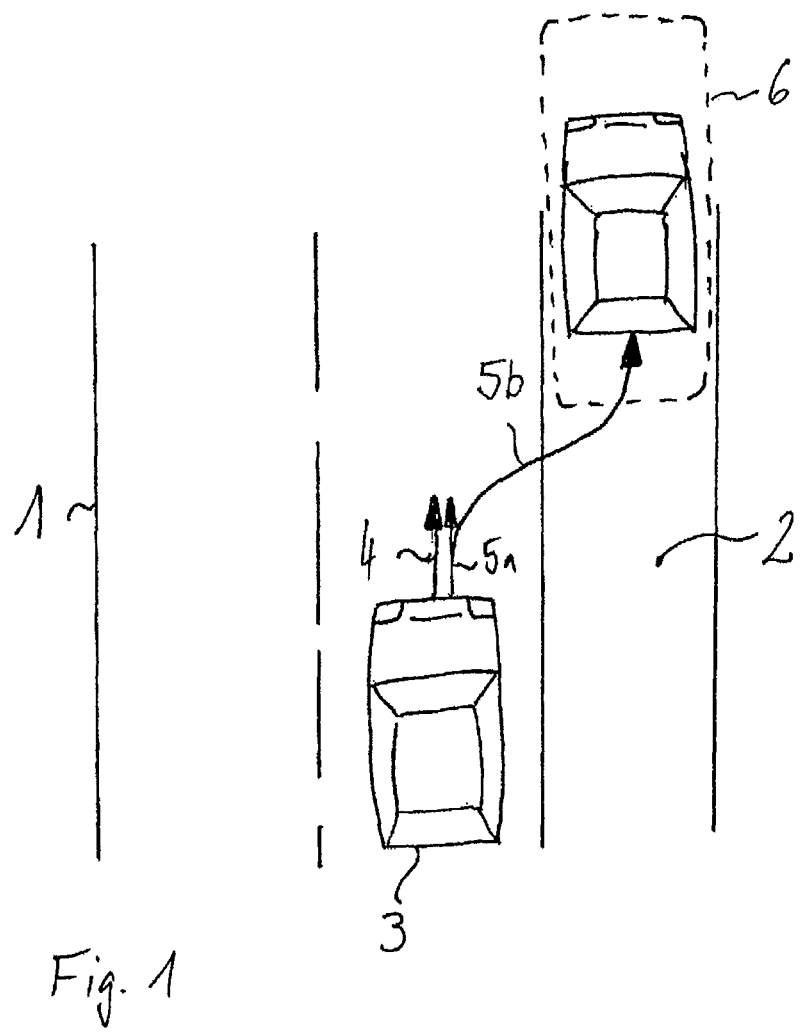
FIG. 1 schematically depicts an automated motor vehicle according to the present invention in a regular mode and in a fault situation.

FIG. 1 depicts a roadway 1 on which a vehicle 3 is moving. Vehicle 3 is capable of driving independently in an automated driving mode. Once the driver has inputted a destination, a trajectory is calculated piece by piece, on the basis of which control instructions for the actuator suite of the vehicle are determined. For movement of vehicle 3 in the normal mode of the automated driving mode, a trajectory 4 has been identified that guides the vehicle along roadway 1 and that corresponds, in the example of the road segment depicted, approximately straight ahead. At the same time, by way of second devices that are designed redundantly with respect to the first devices and can be connected by way of any switchable signal paths from the first devices, either a second trajectory is calculated which corresponds, depending on the system configuration, to continued travel parallel to first trajectory 4, which is depicted in FIG. 1 by trajectory 5a, or a safety trajectory 5b is identified which, in an emergency, i.e. in the event of failure of an operationally necessary component of the autonomous vehicle guidance system, identifies the safe stoppage position 6 located closest to vehicle 3 and brings vehicle 3 safely to a halt at an identified stoppage position 6 without endangering other traffic participants or the vehicle occupants. Stoppage position 6 is detected, depending on the driving situation, from navigation databases and/or by way of surroundings sensors, and can be, for example, a safe stoppage area 2 such as a breakdown lane on an expressway or on a major highway constructed similarly to an expressway, or can be an emergency turnoff, a consolidated roadway shoulder, a parking space that is oriented e.g. parallel to the direction of travel, or an incoming entrance road. Second trajectory 5a or 5b is identified simultaneously with first trajectory 4 and is continuously conveyed to subordinate regulation devices, as is first trajectory 4. If it is ascertained as the driving mode proceeds that long-term operation of vehicle 3 in the automated driving mode along trajectory 4 is no longer possible, vehicle guidance then switches over to the emergency operating mode, and vehicle 3 is guided along the concurrently identified trajectory 5a or along safety trajectory 5b to the nearest stoppage position 6, where the vehicle is automatically brought to a safe halt. An emergency mode of this kind can result from failure of a system component for automated driving. It is also conceivable, however, for a remote vehicle component to fail and to cause a portion of the vehicle's electrical system to shut off, or for continued driving in the automated operating mode no longer to be possible because of a particularly complex surroundings situation or due to the absence of operationally necessary data, and for stoppage of the vehicle in accordance with safety trajectory 5b to be necessary.

Figure 2:
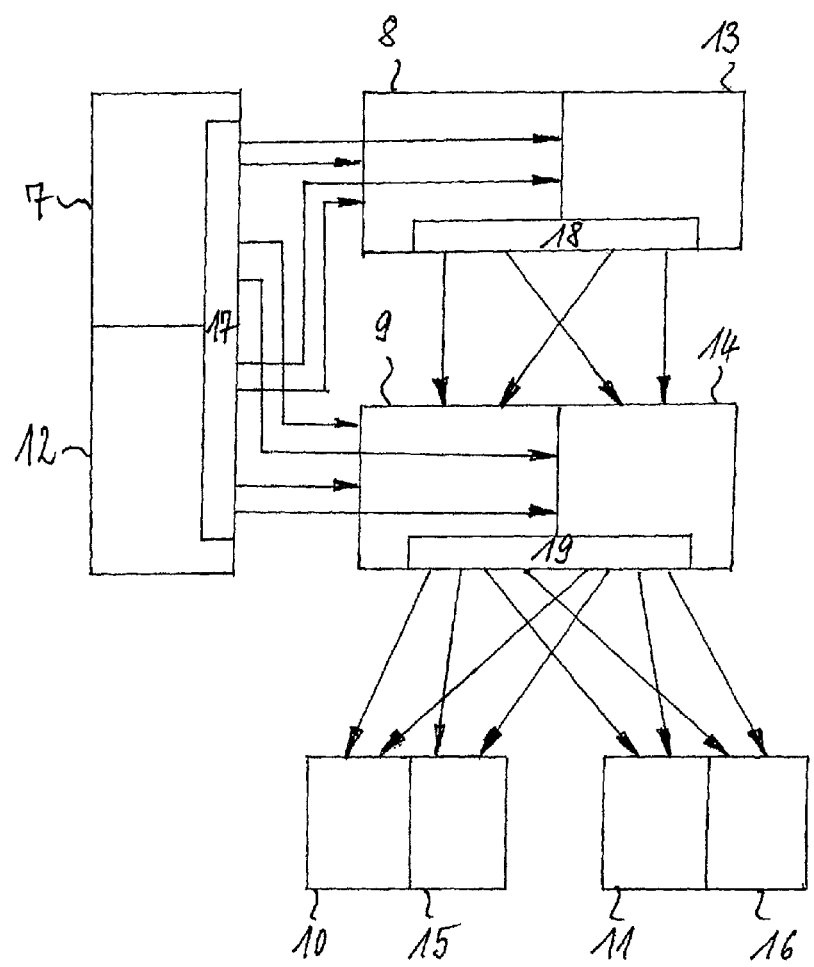
FIG. 2 is a schematic block diagram of an embodiment of the apparatus according to the present invention.

FIG. 2 depicts an architecture for an autonomous vehicle guidance system in which all the components are designed redundantly in terms of communication technology and power supply technology. Each component is connected logically to each of the two redundant preceding components and following components. The components provided are the respective first and second device 7, 12 for identifying the current position of the vehicle and for identifying objects and open spaces in the vehicle surroundings, furthermore first and second planning device 8, 13, furthermore first and second regulation device 9, 14 for identifying actuator control signals, and first and second longitudinal-dynamics-influencing and transverse-dynamics-influencing actuator devices 10, 15, 11, 16. The advantage of this architecture is that individual defective components can be bypassed during operation, which produces a gain in system availability. For safety reasons, because of the absence of redundancy after failure it is recommended to bring the vehicle into a safe state 6 by way of a safety trajectory 5b and to shut off the automated driving function. Switchover of the components in the event of failure must occur in real time, and processing must be continuous with the previous processing. This can be achieved by keeping all the redundant components active in the normal operating situation and concurrently processing the same information using the same functionality, the result being that the same time history is available so that a switchover can occur functionally seamlessly. Determination of the fault situation of one of the components, and thus the switchover between normal operating mode and emergency mode, occur by way of a system state analysis in which the components are continuously monitored by way of plausibility tests, for example by checking checksums in the processing or verification of the intermediate communication components. The outputs and inputs of specific components, or some of the signal transfer paths, can accordingly be deactivated and the automated driving mode can nevertheless be at least transitionally maintained. The system state analysis can be made in a selection device that either can be provided in each component or can be provided outside the system or, as depicted, can be provided jointly for the respective first and second components.

First device 7 for identifying the current position of the vehicle and for identifying objects and open spaces in the vehicle surroundings is evident. Parallel thereto, a second device 12 for identifying the current position of the vehicle and for identifying objects and open spaces in the vehicle surroundings is provided. Each of the two devices 7, 12 identifies, from a position signal, for example the GPS signal, and with the assistance of on-board navigation databases or ones transmitted from an external server, the current position of the vehicle and the course ahead of the journey segment currently being traveled. Provision is furthermore made in these two devices 7, 12 that surroundings sensor suites are connected which can detect objects in the vehicle surroundings, for example other traffic participants or stationary objects, and which are capable of being able to actively detect open spaces that can be used for future vehicle guidance. The position data and vehicle surroundings data thereby identified are conveyed to a first planning device 8 and to a second planning device 13. First and second planning device 8, 13 each identify, from the input data delivered, a respective trajectory that represents the further vehicle guidance. The transfer of data from first and second device 7, 12 for position determination and vehicle surroundings determination can be conveyed in any combination to first and second planning device 8, 13. This is depicted in FIG. 2 by a variety of arrows, so that output signals can be outputted from first localization device 7 to first planning device 8 or selectably to second planning device 13, and the signals outputted from second localization device 12 can likewise be outputted selectably to first planning device 8 or to second planning device 13. It is also possible for data from only one of first localization device 7 or second localization device 12 to be further processed. Trajectories for future vehicle guidance are calculated in first planning device 8 and second planning device 13. Both planning devices 8, 13 can calculate trajectories that correspond to a further subportion of a journey in accordance with a route of travel for a destination inputted by the driver. Because the automated driving mode should be discontinued as soon as possible after a failure of one of the components, provision can alternatively be made that only one trajectory, for example a standard trajectory 4 regarding a future sub-segment of a route of travel in accordance with a destination defined by the driver, is calculated, and the second trajectory is a safety trajectory that brings vehicle 3 safely to a halt at the closest suitable stoppage point 6 without endangering vehicle occupants or other traffic participants. The trajectory data identified in first planning device 8 and second planning device 13 are conveyed to subordinate regulation devices 9, 14. In first regulation device 9 and second regulation device 14, actuator control signals are identified in accordance with the trajectories identified in planning devices 8, 13; with these signals, control can be applied to longitudinal actuators and transverse actuators in order to guide vehicle 3 in accordance with the calculated trajectories 4, 5a, 5b. First and second planning device 8, 13 and first and second regulation device 9, 14 are in turn interconnected by way of signal transfer paths so as to enable arbitrary and redundant transmission of the trajectory data from one of the two planning devices 8, 13 to any downstream regulation device 9, 14. Data continue to be delivered to regulation devices 9, 14 from localization devices 7, 12, since the identification of actuator control signals occurs as a function of identified map data and/or identified vehicle surroundings data. The transmission of position data and vehicle surroundings data from first and second device 7, 12 for identifying the current position of the vehicle and for identifying objects and open spaces in the vehicle surroundings to first and second regulation device 9, 14 also occurs by way of signal transfer paths that, because of the redundancy requirements, can be transferred from any localization device 7, 12 to any regulation device 9, 14. The actuator control signals generated in the first and the second regulation device are then outputted to subordinate actuator devices 10, 15, 11, 16. One or more actuators influencing longitudinal vehicle dynamics are provided in this context, each actuator being present in a redundant dual embodiment 10, 15. Alternatively, it is also possible to provide only one actuator that nevertheless possesses two independent inputs 10, 15, such that each input can adjust the actuator independently of the other input. These longitudinal dynamics actuators 10, 15 can be, for example, power-determining positioning devices of the engine control system, such as throttle valves or fuel quantity metering devices for fuel injectors; they can furthermore also be devices for brake activation, and transmission control systems that select and establish the currently suitable gear ratio. Also provided are actuators 11, 16 for influencing transverse vehicle dynamics by way of which the vehicle direction can be modified, in particular by applying control to the steering device of vehicle 3. The transverse-dynamics-influencing actuators 11, 16 are also embodied in dual fashion, or alternatively can be embodied as a single actuator having two separate signal inputs 11, 16, each input signal 11, 16 being capable of adjusting the actuator independently of the other input signal. This can be realized, for example, using electromagnetic drives having respective mutually independent double windings. The transfer of actuator control signals from first regulation device 9 and second regulation device 14 to first longitudinal-dynamics-influencing actuator device 10, to second longitudinal-dynamics-influencing actuator 15, and to first transverse-dynamics-influencing actuator device 11 and second transverse-dynamics-influencing actuator device 16 can occur by way of mutually independent signal transfer channels, such that each actuator control signal of the first or second regulation device 9, 14 can be outputted and transferred in any combination to any one of the subordinate actuator devices 10, 15, 11, 16. For selection as to which output signal is transferred via which communication channel to which subordinate processing device, it is furthermore possible for first and second devices of a similar processing device always to jointly share a selection device 17, 18, 19. Selection device 17 is in this context the device that checks the correctness of the position data identified in first device 7 and second device 12, and objects and open spaces identified in the vehicle surroundings, and decides as to the communication channels by which the data identified in device 7 and device 12 are transferred to subordinate devices. Selection device 17 also decides whether the data identified in first localization device 7 are outputted to first planning device 8 or to second planning device 13, and whether the data identified in second localization device 12 are outputted to first planning device 8 or to second planning device 13, and whether the data identified in first localization device 7 are outputted to first regulation device 9 or to second regulation device 14, or whether the data identified in second localization device 12 are outputted to first regulation device 9 or to second regulation device 14. A second selection device 18 can also be provided, which checks for correctness the data identified in first planning device 8 and in second planning device 13, decides which data are further processed, furthermore decides as to the communication channel over which the respective data are to be transferred and to which of the subordinate first regulation 9 or second regulation device 14 the respective data are transferred. An analogously embodied selection device 19 is furthermore provided for regulation devices 9 and 14. It is furthermore within the context of the invention that each of the arrows that is depicted in FIG. 2 and represents a possible communication channel is realized by way of two mutually independent transfer channels, so that the respective selection devices 17, 19 additionally decide which of the parallel transfer paths is to be selected for signal transfer in order also to ensure fail-safe reliability of the connecting channels between the individual devices.

What is claimed is:

1. A method for operating a motor vehicle in an automated driving mode, comprising:
   identifying, by a first identification device, the current position of the vehicle, and objects and open spaces currently present in the vehicle surroundings;
   identifying, by a second identification device, the current position of the vehicle, and objects and open spaces currently present in the vehicle surroundings;
   calculating, by a first planning device, a first trajectory for independent vehicle guidance;
   calculating, by a second planning device, a second trajectory for independent vehicle guidance;
   generating, by a first regulation device, first control signals for actuator devices;
   generating, by a second regulation device, second control signals for actuator devices;
   applying control, in accordance with one of the calculated first and second trajectories, to longitudinal-dynamics-influencing actuators and to transverse-dynamics-influencing actuators for vehicle control;
   wherein transfers of (i) at least one of position data and vehicle surroundings data to the planning devices, (ii) information regarding the trajectories to the regulation devices, and (iii) the control signals to the actuators, are enabled using different signal transfer paths.

2. The method as recited in claim 1, wherein the signal transfer paths are independent of one another in order to achieve a fault redundancy.

3. The method as recited in claim 2, wherein at least one selection device decides at least one of:
   whether (i) the position data and surroundings data identified in the first identification device for position identification and for identification of objects and open spaces located in the vehicle surroundings, or (ii) the position data and surroundings data identified in the second device for position identification and for identification of objects and open spaces located in the vehicle surroundings, are conveyed to one of the first and second planning devices;
   whether the first trajectory identified in the first planning device or the second trajectory identified in the second planning device is conveyed to one of the first and second regulation devices; and
   whether the first control signals for actuator devices which are identified in the first regulation device or the second control signals for actuator devices which are identified in the second regulation device are conveyed to one of the signal inputs of the actuators.

4. The method as recited in claim 3, wherein the at least one selection device decides which of multiple redundant signal transfer paths is used to transfer the position data, the surroundings data, the trajectories, and the control signals for actuator devices.

5. The method as recited in claim 3, wherein each of the longitudinal-dynamics-influencing and transverse-dynamics-influencing actuators for vehicle control has at least two signal inputs for redundant application of control.

6. The method as recited in claim 3, wherein at least one of:
   (i) the identifying, by the first identification device, of the current position of the vehicle, and objects and open spaces currently present in the vehicle surroundings, and the identifying, by the second identification device, of the current position of the vehicle, and objects and open spaces currently present in the vehicle surroundings, occur mutually independently;
   (ii) the calculating of the first trajectory in the first planning device and the calculating of the second trajectory in the second planning device occur mutually independently; and
   (iii) the generating of the first control signals for actuator devices in the first regulation device and the generating of the second control signals for actuator devices in the second regulation device occur mutually independently.

7. The method as recited in claim 3, wherein one of the first and second trajectories is a standard trajectory which implements vehicle guidance in accordance with a destination setting defined by the driver and the current surroundings situation, and the other of the first and second trajectories is a safety trajectory which implements a safe stoppage of the vehicle in the event of an emergency as a function of the current vehicle surroundings situation.

8. The method as recited in claim 3, wherein:
   (i) the first and second devices for position identification and for identification of objects and open spaces located in the vehicle surroundings are powered by of mutually independent energy supply systems;
   (ii) the first planning device and the second planning device are powered by mutually independent energy supply systems;
   (iii) the first and second regulation devices are powered by mutually independent energy supply systems; and
   (iv) the respective first and second signal input of the actuator devices are powered by way of mutually independent energy supply systems.

9. An apparatus for operating a motor vehicle in an automated driving mode, comprising:
   a first identification device identifying the current position of the vehicle, and objects and open spaces currently present in the vehicle surroundings;
   a second identification device identifying the current position of the vehicle, and objects and open spaces currently present in the vehicle surroundings;
   a first planning device calculating a first trajectory for independent vehicle guidance;
   a second planning device calculating a second trajectory for independent vehicle guidance;
   a first regulation device generating first control signals for actuator devices;
   a second regulation device generating second control signals for actuator devices; and
   at least one longitudinal-dynamics-influencing actuator and at least one transverse-dynamics-influencing actuator for controlling the vehicle in accordance with one of the calculated first and second trajectories;

wherein signal transfer between the first and second identification devices and the first and second planning devices is implemented by multiple mutually independent signal transfer paths;

wherein signal transfer between the first and second planning devices and the first and second regulation devices is implemented by multiple mutually independent signal transfer paths; and wherein signal transfer between the first and second regulation devices and the first and second signal inputs of the respective actuators is implemented by multiple mutually independent signal transfer paths.

10. The apparatus as recited in claim 9, wherein at least one of:
  in the first and second identification devices, a common selection device is provided which decides whether (i) the position data and surroundings data identified in the first identification device for position identification and for identification of objects and open spaces located in the vehicle surroundings, or (ii) the position data and surroundings data identified in the second device for position identification and for identification of objects and open spaces located in the vehicle surroundings, are conveyed to one of the first and second planning devices;
  in the first and second planning devices, a common selection device is provided which decides whether the first trajectory identified in the first planning device or the second trajectory identified in the second planning device is conveyed to one of the first and second regulation devices; and
  in the first and the second regulation device, a common selection device is provided which decides whether the first control signals for actuator devices which are identified in the first regulation device or the second control signals for actuator devices which are identified in the second regulation device are conveyed to one of the signal inputs of the actuators.

11. The apparatus as recited in claim 10, wherein each of the longitudinal-dynamics-influencing and transverse-dynamics-influencing actuators for vehicle control has at least two signal inputs for redundant application of control.

12. The apparatus as recited in claim 10, wherein:
  (i) the first and second devices for position identification and for identification of objects and open spaces located in the vehicle surroundings are powered by of mutually independent energy supply systems;
  (ii) the first planning device and the second planning device are powered by mutually independent energy supply systems;
  (iii) the first and second regulation devices are powered by mutually independent energy supply systems; and
  (iv) the respective first and second signal input of the actuator devices are powered by way of mutually independent energy supply systems.

* * * * *